(12) United States Patent
Zhu et al.

(10) Patent No.: US 11,333,834 B2
(45) Date of Patent: May 17, 2022

(54) POLARIZATION MAINTAINING CONNECTOR

(71) Applicant: HYC Co., Ltd., Qingyuan (CN)

(72) Inventors: Lei Zhu, Qingyuan (CN); Haibo Yang, Qingyuan (CN)

(73) Assignee: HYC CO., LTD., Qingyuan (CN)

( * ) Notice: Subject to any disclaimer, the term of this patent is extended or adjusted under 35 U.S.C. 154(b) by 0 days.

(21) Appl. No.: 16/944,330

(22) Filed: Jul. 31, 2020

(65) Prior Publication Data

US 2021/0033799 A1 Feb. 4, 2021

(30) Foreign Application Priority Data

Aug. 2, 2019 (CN) .......................... 201921245416.4

(51) Int. Cl.
*G02B 6/38* (2006.01)
(52) U.S. Cl.
CPC ......... *G02B 6/3812* (2013.01); *G02B 6/3821* (2013.01); *G02B 6/3869* (2013.01); *G02B 6/3871* (2013.01)
(58) Field of Classification Search
CPC .... G02B 6/3812; G02B 6/3821; G02B 6/385; G02B 6/3869; G02B 6/3871
See application file for complete search history.

(56) References Cited

U.S. PATENT DOCUMENTS

| | | | | |
|---|---|---|---|---|
| 5,809,192 A * | 9/1998 | Manning | .............. | G02B 6/3843 385/76 |
| 6,318,903 B1 * | 11/2001 | Andrews | .............. | G02B 6/3825 385/77 |
| 6,955,479 B2 * | 10/2005 | Erdman | ............... | G02B 6/3843 385/78 |
| 7,553,089 B2 * | 6/2009 | Gurreri | ................ | G02B 6/3831 385/60 |
| 11,054,586 B2 * | 7/2021 | Morishima | .......... | G02B 6/3869 |
| 2002/0085815 A1 * | 7/2002 | Shinagawa | .......... | G02B 6/3871 385/78 |
| 2003/0161586 A1 * | 8/2003 | Hirabayashi | ......... | G02B 6/3851 385/78 |
| 2016/0139344 A1 * | 5/2016 | de los Santos Campos | ................ | G02B 6/3869 385/78 |

\* cited by examiner

*Primary Examiner* — Daniel Petkovsek
(74) *Attorney, Agent, or Firm* — Hunton Andrews Kurth LLP

(57) ABSTRACT

Disclosed is a polarization maintaining connector. The PM connector includes an outer frame, a ferrule structure and an adjustment member. The outer frame forms a main structure of the PM connector. The ferrule structure is provided with a channel for a fiber core to pass through. The ferrule structure is at least partially disposed inside the outer frame and forms a slidable and rotatable connection with the outer frame. The adjustment member forms an axially slidable connection with the ferrule structure and is circumferentially non-rotatable relative to the ferrule structure. The adjustment member is relatively rotatable to the outer frame and has a rotating state and a holding state. The adjustment member keeps relatively rotatable to the outer frame when in the rotating state and keeps relatively secured to the outer frame when in the holding state.

2 Claims, 5 Drawing Sheets

POLARIZATION MAINTAINING CONNECTOR

CROSS-REFERENCE TO RELATED APPLICATION

This application claims priority to a Chinese patent application No. 201921245416.4 filed on Aug. 2, 2019, disclosure of which is incorporated herein by reference in its entirety.

TECHNICAL FIELD

The present disclosure relates to the technical field of connectors and, in particular, to a polarization maintaining connector.

BACKGROUND

A polarization maintaining (PM) optical fiber patch cord has excellent environmental stability. The PM optical fiber patch cord is mainly applied in the production of fiber lasers/fiber amplifiers and the research of test instruments, and also partially applied in the fields of high-speed fiber communication, integrated optical packaging and interferometer sensing. PM optical fiber is also called panda optical fiber since there are two core transmission centers inside the PM optical fiber and the section view of the PM optical fiber is thus similar to panda eyes when viewed through a common magnifying glass. The PM patch cord requires a connector to be aligned with an adapter more precisely to ensure the direction of a PM optical axis, so that the PM optical fiber patch cord has good extinction ratio repeatability and low insertion loss. In the manufacturing process, the angle of an optical fiber is appropriately adjusted, in most cases, by rotating the optical fiber when the curing adhesive has not be cured, and then, pre-curing is performed. During the pre-curing process, angular deflection may occur due to incomplete drying of the adhesive. Once the angular deflection is too large, the cured products are scrapped. In addition, both the curing and adjustment processes are performed on the relatively expensive equipment, and the high occupancy rate of the equipment leads to low production efficiency.

SUMMARY

The object of the present disclosure is to provide a polarization maintaining (PM) connector. The PM connector helps to adjust the angle of a ferrule before the curing so that it is very convenient to adjust the angle of optical fiber.

A PM connector is provided in the present disclosure. The PM connector includes an outer frame, a ferrule structure and an adjustment member.

The outer frame forms a main structure of the PM connector.

The ferrule structure is provided with a channel for a fiber core to pass through. The ferrule structure is at least partially disposed inside the outer frame and forms a slidable and rotatable connection with the outer frame.

The adjustment member forms an axially slidable connection with the ferrule structure and is circumferentially non-rotatable relative to the ferrule structure.

The adjustment member is relatively rotatable to the outer frame and has a rotating state and a holding state. The adjustment member keeps relatively rotatable to the outer frame when in the rotating state and keeps relatively secured to the outer frame when in the holding state.

The beneficial effects are described below.

The present disclosure discloses a PM connector. The PM connector includes an outer frame, a ferrule structure and an adjustment member. The outer frame forms a main structure of the PM connector. The ferrule structure is provided with a channel for a fiber core to pass through. The ferrule structure is at least partially disposed inside the outer frame and forms a slidable and rotatable connection with the outer frame. The adjustment member forms an axially slidable connection with the ferrule structure and is circumferentially non-rotatable relative to the ferrule structure. The adjustment member is relatively rotatable to the outer frame and has a rotating state and a holding state. The adjustment member keeps relatively rotatable to the outer frame when in the rotating state and keeps relatively secured to the outer frame when in the holding state. With such configuration, it is very convenient to adjust the angle of an optical fiber by adjusting the angle of the adjustment member at the initial stage to perform alignment. Then, the adjustment member can keep unmovable so that the ferrule structure is prevented from rotating and the angle change of the optical fiber is avoided.

Figure 1:
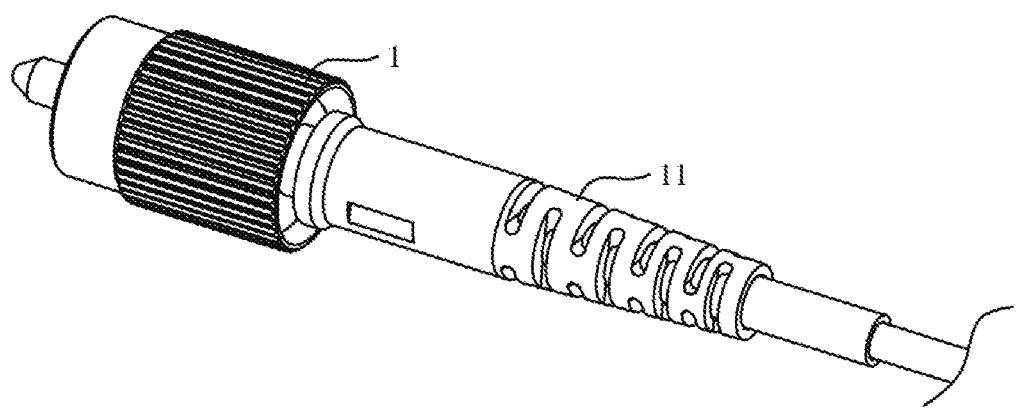
FIG. 1 is a schematic structure view of an FC-type connector according to the present disclosure.

REFERENCE LIST 1 outer frame
2 ferrule structure
3 adjustment member
11 tail sleeve
21 tail shank
22 ferrule
23 spring
31 groove
211 boss structure
212 plug-in protrusion

DETAILED DESCRIPTION

To better illustrate the solved problem, adopted solution and achieved effects of the present disclosure, the present disclosure is further described below in conjunction with the embodiments and drawings.

In the description of the present disclosure, it is to be understood that the orientational or positional relationships indicated by terms "above", "below", "front", "rear", "left", "right", "vertical", "horizontal", "top", "bottom", "inside", "outside" and the like are based on the orientational or positional relationships illustrated in the drawings. These relationships are for the mere purpose of facilitating and simplifying the description of the present disclosure, and do not indicate or imply that the device or component referred to has a specific orientation and is constructed and operated in a specific orientation. Thus, these relationships shall not be construed as limiting the present disclosure.

Figure 2:
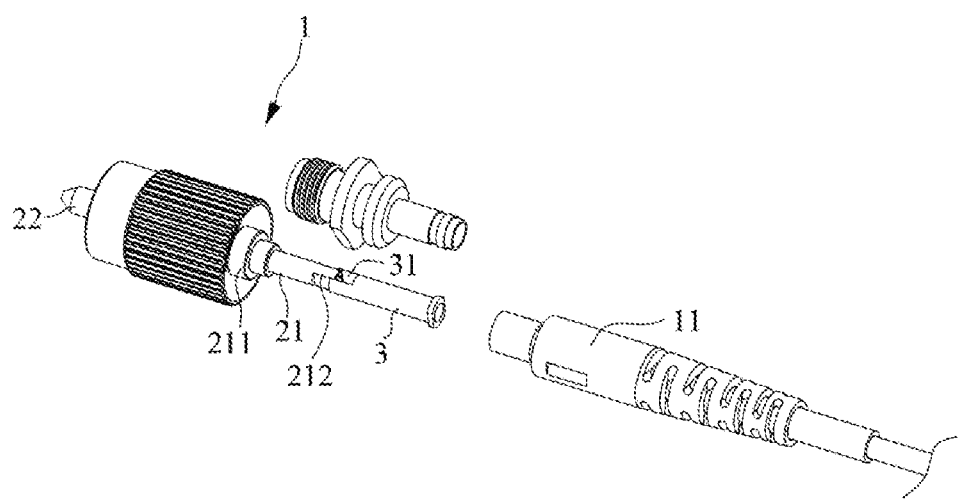
FIG. 2 is an exploded view of the FC-type connector according to the present disclosure.
Figure 3:
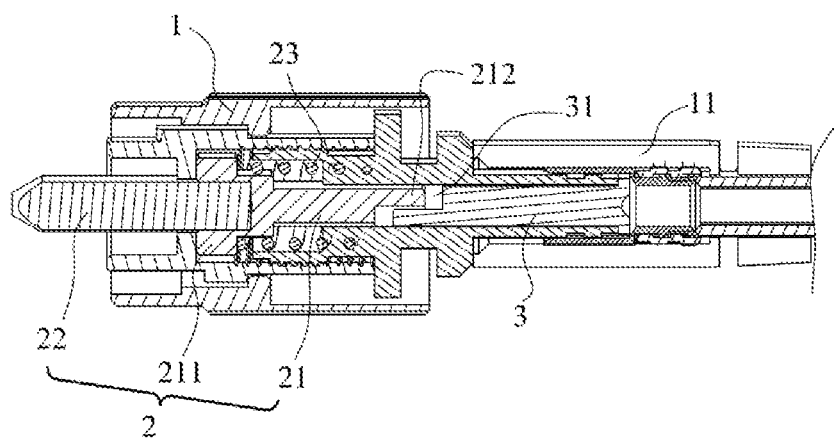
FIG. 3 is a cross-sectional view of the FC-type connector according to the present disclosure.
Figure 4:
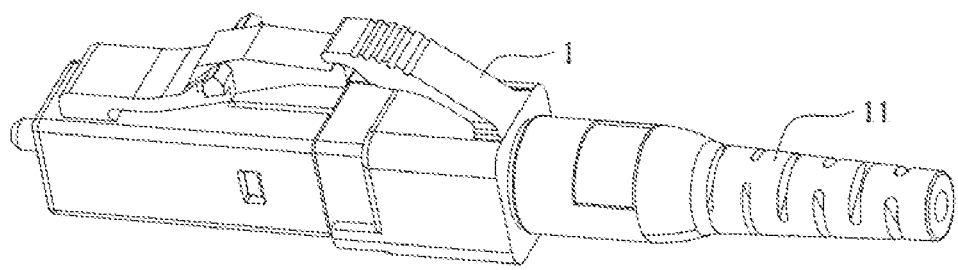
FIG. 4 is a schematic structure view of an LC-type connector according to the present disclosure.
Figure 5:
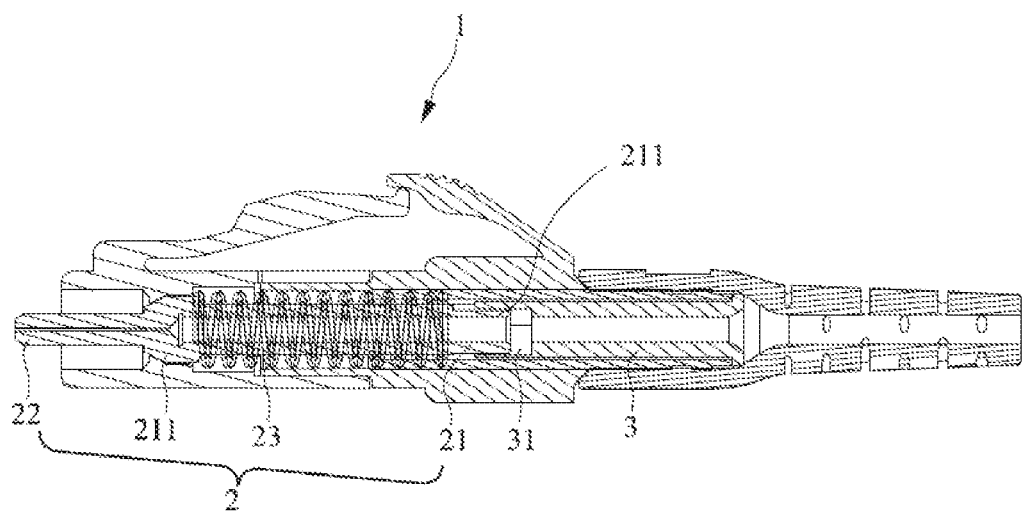
FIG. 5 is a cross-sectional view of the LC-type connector according to the present disclosure.
Figure 6:
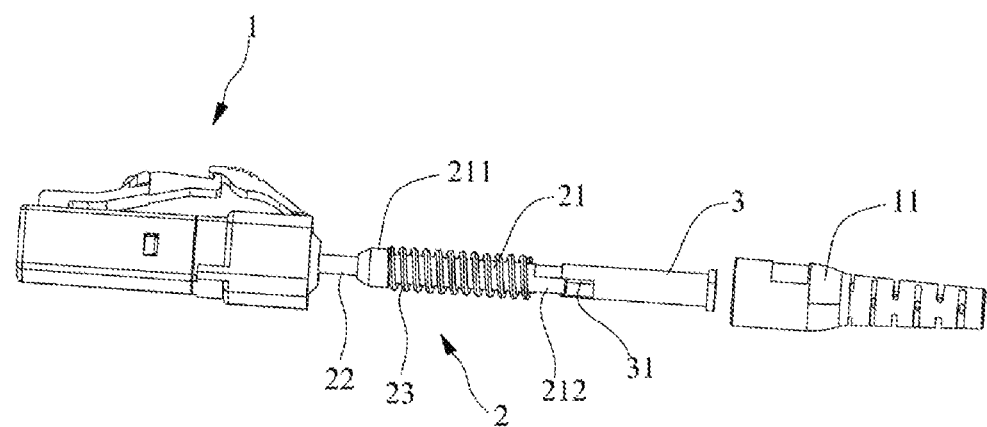
FIG. 6 is an exploded view of the LC-type connector according to the present disclosure.
Figure 7:
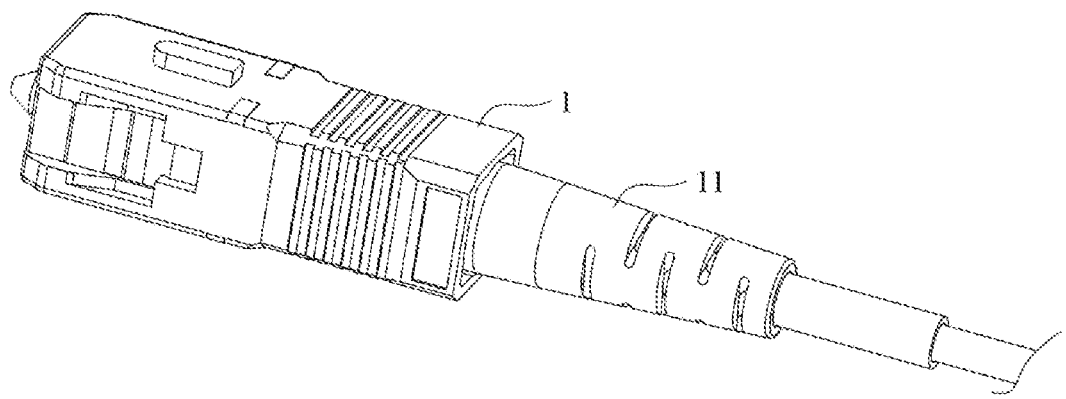
FIG. 7 is a schematic structure view of an SC-type connector according to the present disclosure.
Figure 8:
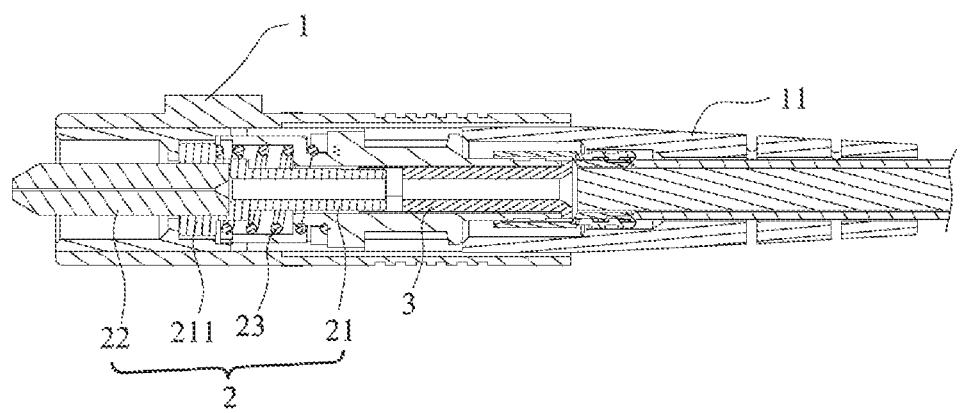
FIG. 8 is a cross-sectional view of the SC-type connector according to the present disclosure.
Figure 9:
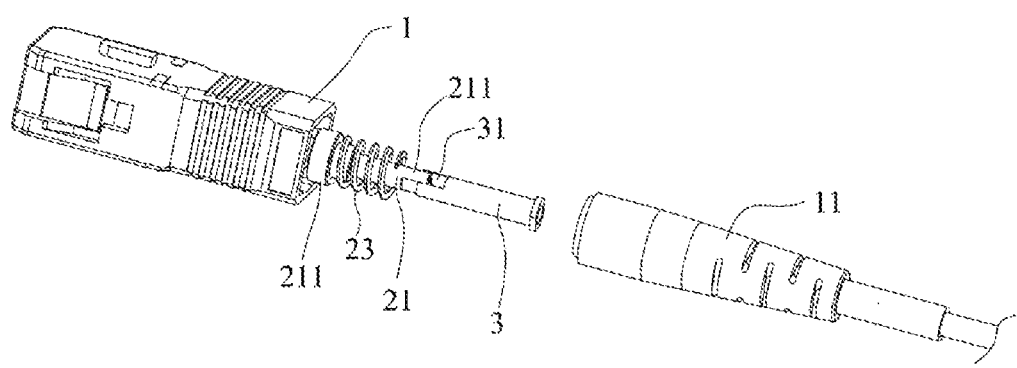
FIG. 9 is an exploded view of the SC-type connector according to the present disclosure.
Figure 10:
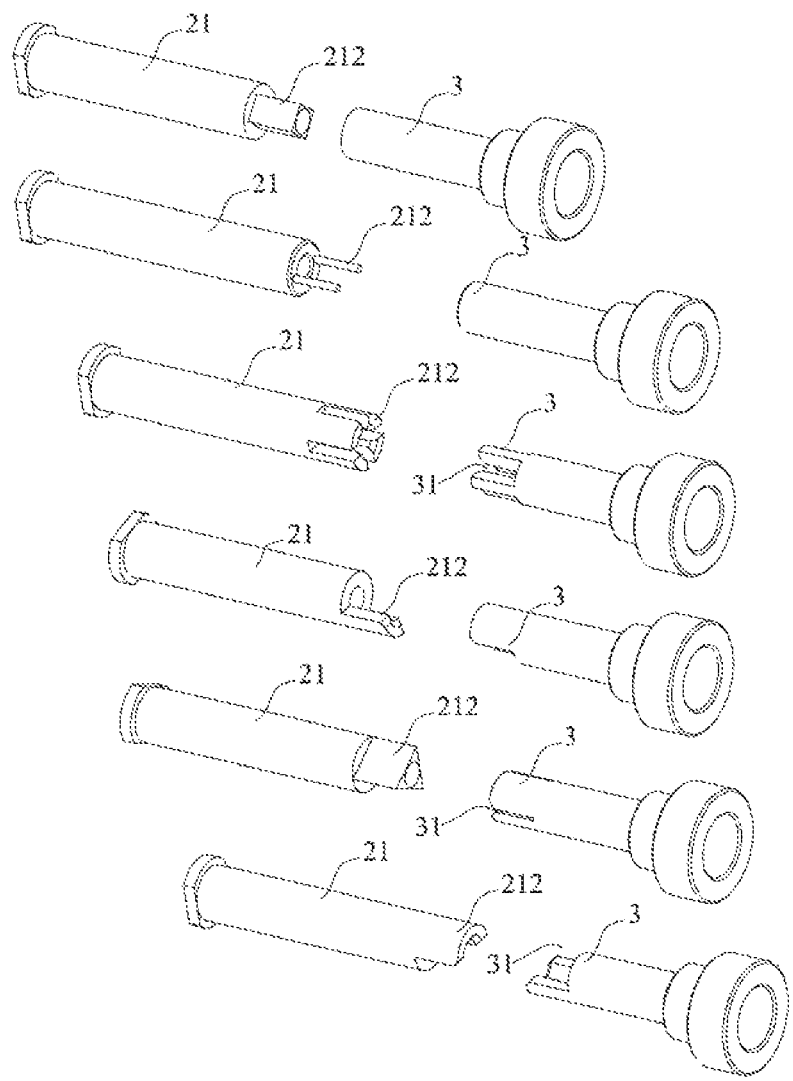
FIG. 10 is a first schematic structure view of tail shanks and adjustment members in various forms.
Figure 11:
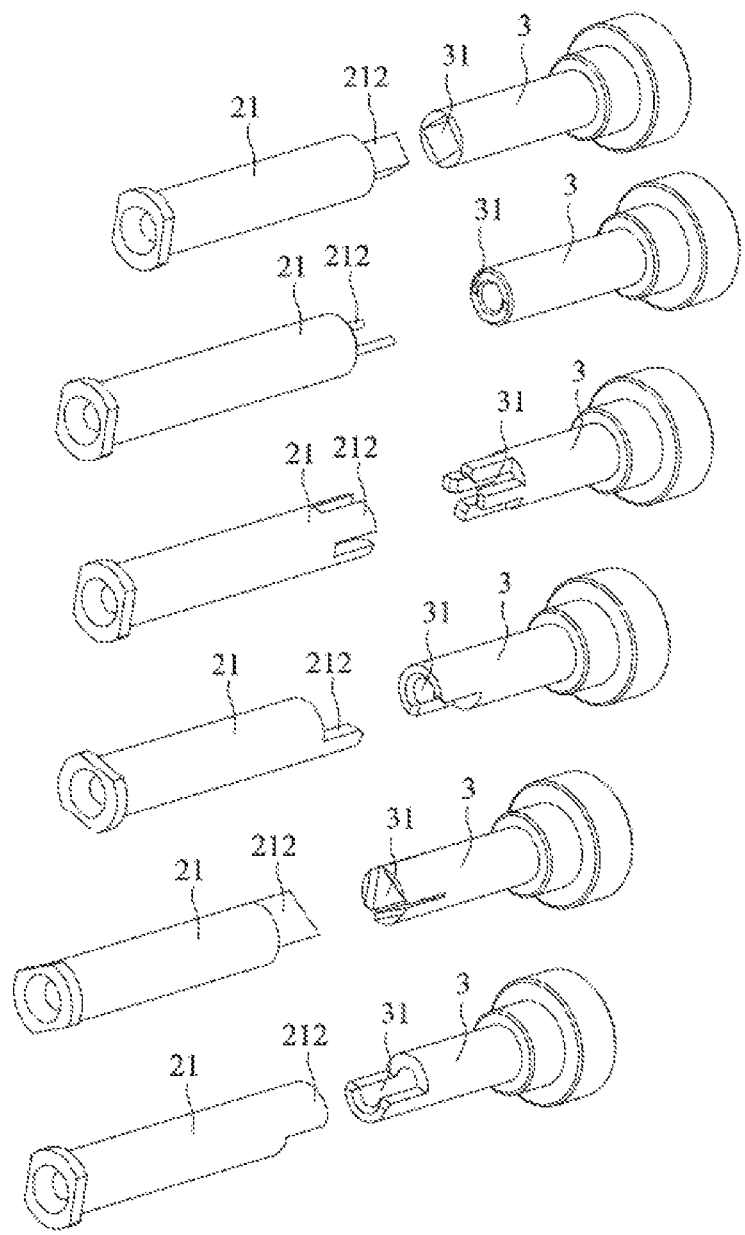
FIG. 11 is a second schematic structure view of tail shanks and adjustment members in various forms.

As shown in FIGS. 1 to 9, the present disclosure discloses a polarization maintaining (PM) connector. The PM connector includes an outer frame 1, a ferrule structure 2 and an adjustment member 3. The outer frame 1 forms a main structure of the PM connector. Different types of connectors may have corresponding differences in structure of the outer frame 1. For example, FIGS. 1 to 9 shows different types of connectors such as FC, LC and SC. Each type of connector has a respective main frame structure. The outer frame 1 may include a middle frame, a tail sleeve 11 and the like, which are collectively referred to as the outer frame 1.

The ferrule structure 2 is in precise fit with an optical fiber adapter or the like. The ferrule structure 2 is provided with a channel for a core to pass through. After the PM connector is fitted with the optical fiber adapter, the core of the optical fiber is butted with other connectors or splitting mechanisms by using the ferrule structure 2 to form a light transmission channel.

The ferrule structure 2 may include a tail shank 21 and the ferrule 22 that are secured relative to each other along the axial direction. The tail shank 21 and the ferrule 22 are each designed with a channel for the core to pass through. A boss structure 211 is disposed around the tail shank 21. Certainly, the ferrule structure 2 may be provided with only the ferrule 22 instead of two or more components.

The ferrule structure 2 is at least partially disposed inside the outer frame 1 and may have a part protruding from the end of the outer frame 1. Such configuration facilitates the fit with the optical fiber adapter.

The ferrule structure 2 forms a slidable and rotatable connection with the outer frame 1. That is, the ferrule structure 2 is free to slide and rotate within the outer frame. The "slidable connection" may mean that the ferrule structure 2 is slidablely connected to the outer frame 1 only along an axial direction of the ferrule structure 2, and the "rotatable connection" may mean that the ferrule structure 2 is freely rotatable along a circumferential direction of the ferrule structure 2. The axial direction of the ferrule structure 2 is a direction along which the ferrule structure 2 is inserted into the optical fiber adapter. The axially slidable connection between the ferrule structure 2 and the outer frame 1 may be formed via the fit between the ferrule structure 2 and the outer frame 1. For example, the ferrule structure 2 has an axially rotating shape, and a circular hole or an arc-shaped hole structure limit is correspondingly disposed inside the outer frame 1, so that the ferrule structure 2 can axially slide and circumferentially rotate. The axially slidable connection between the ferrule structure 2 and the outer frame 1 may be formed via the fit between the ferrule structure 2, the outer frame 1 and other components.

The adjustment member 3 forms an axially slidable connection with the ferrule structure 2 and is relatively non-rotatable along a circumferential direction.

The "relatively non-rotatable along the circumferential direction" means that along the circumferential direction of the ferrule structure 2, the adjustment member 3 and the ferrule structure 2 are limited to each other and cannot rotate relatively. That is, when one of the adjustment member 3 and the ferrule structure 2 rotates along the circumferential direction of the ferrule structure 2, the one may drive the other one of the adjustment member 3 and the ferrule structure 2 to rotate together. Additionally, the relative non-rotatability between the ferrule structure 2 and the adjustment member 3 may be achieved by forming a continuous limit between the ferrule structure 2 and the adjustment member 3 by a secured limit structure. That is, the state of relative non-rotatability along the circumferential direction is maintained all the time.

The relative non-rotatability between the structure ferrule 2 and the adjustment member 3 may be intermittent or have different states. That is, the ferrule structure 2 and the adjustment member 3 may be in the relatively non-rotatable state in some conditions and get out of the relatively non-rotatable state in other conditions. However, the adjustment member 3 needs to remain relatively non-rotatable to the ferrule structure 2 at least in a certain condition so that the circumferential angle of the ferrule structure 2 can be adjusted by using the adjustment member 3. For example, a locking member or a holding member is disposed between the ferrule structure 2 and the adjustment member 3. When the locking member or the holding member locks or holds the ferrule structure 2 to the adjustment member 3, the ferrule structure 2 and the adjustment member 3 are relatively non-rotatable. When the locking member or the holding member unlocks or releases the ferrule structure 2 from the adjustment member 3, the ferrule structure 2 and the adjustment member 3 are relatively rotatable to each other.

In this embodiment, the ferrule structure 2 and the adjustment member 3 may be axially slidable and circumferentially non-rotatable relative to each other via various structures. For example, the tail of the ferrule structure 2 and the adjustment member 3 may be fitted with each other in a plug-in manner, the tail of the ferrule structure 2 is provided with a plug-in protrusion 212 along the axial direction, and an end of the adjustment member 3 facing the ferrule structure 2 is provided with a groove 31 or a receptacle. Certainly, the position of the plug-in protrusion 212 may be interchanged with the position of the groove 31 or the receptacle. The ferrule structure 2 is slidable along the axial direction. Due to the limit of the plug-in structure, the ferrule structure 2 and the adjustment member 3 can just keep synchronous rotation. The groove 31 and the plug-in protrusion 212 may have various shapes. For example, the plug-in protrusion 212 may be protrusion structures extending from two sides or the circumference of the end of the ferrule structure 2 and spaced apart from each other, such as two, three or more protruding columns. Alternatively, the plug-in protrusion 212 may be a columnar structure protruding from the middle and having a triangular or polygonal cross section, or other structures capable of maintaining a circumferential rotating limit. The groove 31 and the plug-in protrusion 212 are fitted with each other to form the circumferential rotating limit.

The cross-section of the other end of the adjustment member 3 may be designed as a racetrack shape, a polygonal shape or other shape. Such configuration helps to rotate the adjustment member 3 by using some tool from this end. Certainly, the adjustment member 3 may be provided with an adjustment hole or an adjustment limit protrusion, and, other structures may be inserted into the adjustment hole or sleeved on the adjustment limit protrusion by using tools and adjust the rotating angle of the adjustment member 3.

The adjustment member 3 is relatively rotatable to the outer frame 1 and has a rotating state and a holding state. The adjustment member 3 keeps relatively rotatable to the outer frame 1 when in the rotating state and keeps relatively secured to the outer frame 1 when in the holding state.

Since the adjustment member 3 is relatively rotatable to the outer frame 1, when the angle of the optical fiber in the PM connector needs to be adjusted, it is feasible to adjust the angle of the adjustment member 3 to drive the ferrule 22 to rotate, so as to drive the optical fiber to rotate. When the angle of the optical fiber is adjusted in place, it is feasible to set the adjustment member to the holding state so as to keep the ferrule 22 non-rotatable and keep an unchangeable angle of the optical fiber.

The rotating state and the holding state of the optical fiber between the adjustment member 3 and the outer frame 1 may be implemented via different structures. For example, a certain friction force is set between the adjustment member 3 or the ferrule structure 2 and the outer frame 1. A certain acting force is applied between the adjustment member 3 or the ferrule structure 2 and the outer frame 1, and then a certain friction force is produced by the friction between the adjustment member 3 or the ferrule structure 2 and the outer frame 1. This frictional force can keep the adjustment member 3 or the ferrule structure 2 relatively secured to the outer frame 1, that is, in the holding state, thereby preventing the adjustment member 3 or the ferrule structure 2 from rotating. When the adjustment member 3 is subjected to a relatively large external twisting force, for example, an operator twists the adjustment member 3 with a twisting force exceeding the friction force of the adjustment member 3 or the ferrule structure 2, the adjustment member 3 is rotated and turns to the rotating state. In this embodiment, a spring 23 is sleeved on the ferrule structure 2. The spring 23 can push the ferrule structure 2 to protrude outwards and push the ferrule structure 2 or the adjustment member 3 to abut against the outer frame 1, so as to produce a corresponding friction force. Thus, the adjustment member 3 or the ferrule structure 2 keeps relatively stable to the outer frame 1.

Additionally, a locking member or a holding member may be disposed between the outer frame 1 and the adjustment member 3. When the locking member or the holding member locks or holds the adjustment member 3 or the ferrule structure 2 to the outer frame 1, the adjustment member 3 or the ferrule structure 2 is relatively non-rotatable to the outer frame 1. When the locking member or the holding member unlocks or releases the adjustment member 3 or the ferrule structure 2 from the outer frame 1, the adjustment member 32 or the ferrule structure 2 is relatively rotatable to the outer frame 1.

Since the angle of the optical fiber is only adjusted at the initial stage and keeps unchangeable in the subsequent use, the adjustment member 3 may be further secured to the outer frame 1 after the adjustment member 3 is in the holding state. For example, the adhesive may be dispensed between the adjustment member 3 and the outer frame 1, and after the angle of the adjustment member 3 is adjusted in place, the adjustment member 3 is completely secured to the outer frame 1 through the heating and curing, or other curing methods. Then, the ferrule structure 2 is axially movable and circumferentially non-rotatable, thereby avoiding change in the angle of the optical fiber.

The above are merely preferred embodiments of the present disclosure. Those of ordinary skill in the art will make modifications in the embodiments and application scope according to the present disclosure. The content of this specification is not to be construed as limiting the present disclosure.

What is claimed is:

1. A polarization maintaining connector, comprising:
   an outer frame;
   a ferrule structure, which is provided with a channel for a fiber core to pass through, wherein the ferrule structure is at least partially disposed inside the outer frame and forms a slidable and rotatable connection with the outer frame;
   a spring, which is interposed between the ferrule structure and the outer frame so that the spring is capable of pushing the ferrule structure to protrude outwards while pushing the ferrule structure to abut against the outer frame, thereby enabling generation of a friction force between the ferrule structure and the outer frame when the ferrule structure rotates relative to the outer frame; and
   an adjustment member, which is connected to the ferrule structure through a plug-in structure,
   wherein the plug-in structure comprises a plug-in protrusion and a groove, wherein one of the plug-in protrusion and the groove is axially provided on an end surface of one end of the ferrule structure disposed inside the outer frame, and the other one of the plug-in protrusion and the groove is axially provided on an end surface of one end of the adjustment member facing the one end of the ferrule structure; and wherein the plug-in protrusion and the groove are capable of cooperating with each other so that the ferrule structure is axially slidable relative to the adjustment member and the ferrule structure is rotatable relative to the outer frame when driven by the adjustment member,
   wherein the adjustment member is rotatable relative to the outer frame and has a rotating state and a holding state; when the adjustment member is subjected to an external twisting force that exceeds the friction force, the adjustment member is in the rotating state and keeps rotatable relative to the outer frame; and when the adjustment member is subjected to an external twisting force that does not exceed the friction force, the adjustment member is in the holding state and keeps non-rotatable relative to the outer frame.

2. The polarization maintaining connector of claim 1, wherein a locking member or a holding member is disposed between the outer frame and the adjustment member so that when the locking member or the holding member unlocks or releases the adjustment member, the adjustment member keeps rotatable relative to the outer frame, and when the locking member or the holding member locks or holds the adjustment member to the outer frame, the adjustment member keeps non-rotatable relative to the outer frame.

* * * * *